US007344661B2

(12) United States Patent
Kuehl

(10) Patent No.: US 7,344,661 B2
(45) Date of Patent: Mar. 18, 2008

(54) ELECTROMAGNETIC ENERGY ADAPTATION MATERIAL

(76) Inventor: Scott Allan Kuehl, 8 Palmyra Road, Herldervue, Somerset-West, 7135 (ZA)

( * ) Notice: Subject to any disclaimer, the term of this patent is extended or adjusted under 35 U.S.C. 154(b) by 0 days.

(21) Appl. No.: 10/433,954

(22) PCT Filed: Dec. 5, 2001

(86) PCT No.: PCT/IB01/02293

§ 371 (c)(1),
(2), (4) Date: Jun. 9, 2003

(87) PCT Pub. No.: WO02/46285

PCT Pub. Date: Jun. 13, 2002

(65) Prior Publication Data

US 2004/0048939 A1 Mar. 11, 2004

(30) Foreign Application Priority Data

Dec. 8, 2000 (ZA) ................................ 2000/7284

(51) Int. Cl.
*F21V 9/00* (2006.01)
*G02B 5/22* (2006.01)
*B01F 2/04* (2006.01)
*B01F 17/00* (2006.01)
*C08J 9/04* (2006.01)

(52) U.S. Cl. ........................ 252/582; 252/583; 516/10; 516/50

(58) Field of Classification Search ................ 252/582, 252/583; 516/10; 521/50
See application file for complete search history.

(56) References Cited

U.S. PATENT DOCUMENTS 4,530,939 A 7/1985 Rickle
4,575,521 A 3/1986 Cote et al.
4,732,181 A 3/1988 Sollander et al.
4,889,750 A * 12/1989 Wiley ........................ 428/34.2
5,876,643 A * 3/1999 Biggs et al. .................. 264/86
6,080,795 A * 6/2000 Pantini ........................ 521/50
6,090,762 A * 7/2000 Clapperton et al. ......... 510/108
6,093,410 A * 7/2000 Peffly et al. ................ 424/401

FOREIGN PATENT DOCUMENTS

EP 0 018 956 11/1980
EP 0 209 395 1/1987
EP 0 255 319 2/1988
EP 0 364 820 4/1990
EP 0 394 207 10/1990
EP 0 864 317 9/1998
FR 2 521 715 8/1983
FR 2521715 * 8/1983
JP 06093128 * 4/1994
JP 07157589 * 6/1995
JP 8 130 388 5/1996
JP 8 130 389 5/1996
JP 08130388 * 5/1996
JP 08130389 * 5/1996
JP 08157634 * 6/1996
JP 09221562 * 8/1997
SU 979404 * 4/1981
WO WO 98/12247 3/1998

OTHER PUBLICATIONS

Derwent Abstract Accession No. 92-386521/47, JP 04 285 642, Oct. 9, 1992.
Derwent Abstract Accession No. 94-148042/18, JP 06 093 128, Apr. 5, 1994.
Derwent Abstract Accession No. 95-252353/33, JP 07 157 589, Jun. 20, 1995.
Derwent Abstract Accession No. 96-339309/34, JP 08/157 634, Jun. 18, 1996.
Derwent Abstract Accession No. 97-475516/44, JP 09 221 562, Aug. 26, 1997.
Derwent Abstract Accession No. 83-781741/40, SU 979 404, Dec. 7, 1982.
Hawley, The Condensed Chemical Dictionary, Ninth Edition, pp. 262, 392, 830, Jun. 12, 1978.
Encyclopedia of Polymer Science and Technology—Plastics, Resins, Rubbers, Fibers, vol. 3, Interscience Publishers, Nov. 10, 1966, p. 89.

* cited by examiner

*Primary Examiner*—Randy Gulakowski
*Assistant Examiner*—Timothy J. Kugel
(74) *Attorney, Agent, or Firm*—Stites & Harbison PLLC; Stephen J. Weyer

(57) ABSTRACT

The invention discloses an electromagnetic energy adaptation material, which can absorb electromagnetic energy, the material including a mixture of at least one liquid with at least one surfactant. The liquid may be a dipolar molecular liquid, and may be pressurized by means of a gas. Further the use of an electromagnetic energy adaptation material in the form of a foam for covering an object to prevent detection thereof by an electromagnetic energy detection apparatus, such as radar equipment, is disclosed. Finally a method of minimizing or altering detection of an object by means of electromagnetic energy detection apparatus is suggested, which includes the steps of coating such an object or a zone spaced away from such an object at least partially by means of a foam of an electromagnetic energy adaptation material.

4 Claims, 16 Drawing Sheets

ELECTROMAGNETIC ENERGY ADAPTATION MATERIAL

FIELD OF INVENTION

The present invention relates to electromagnetic energy adaptation material.

More particularly, the invention relates to electromagnetic energy adaptation material, which is capable of absorbing or altering the reflection or emission of electromagnetic energy thereby enabling a body covered by the material to appear to be different than what it truly is.

BACKGROUND TO INVENTION

An electromagnetic wave absorber is a material that is designed to exhibit a balance between wave reflection, wave transmission and wave absorption or otherwise influence an electromagnetic wave incident upon it. The interaction between an electromagnetic wave and a medium is described completely by the complex permittivity and permeability. In the case of a non-magnetic medium, the complex permittivity describes the material completely, and thus the reflection, transmission and absorption coefficients. An efficient or effective electromagnetic wave absorber is one that minimises surface reflection and at the same time has sufficient absorptive properties so that transmitted radiation is reduced. The main object is to replace the appearance of an object by a smaller or different one determined by a cloaking material designed to hide the object.

In designing an electromagnetic wave absorber, one attempts to employ substances, which offer control of the loss mechanism and by way of this, offer control of the parameters governing the magnitude of the incident reflection. Sometimes other physical properties may play a role in the ability to influence the absorption or alteration of electromagnetic radiation. The thermal conductivity and emisivity are two parameters that can be exploited to further alter the appearance of a covered body.

In the present state of the art, control of microwave reflectivity has been demonstrated by simultaneous control of the bulk density of the material and the volume concentration of additives used to introduce the loss. The substances employed to introduce loss within the scope of the present state of the art are typically substances that exhibit Ohmic losses. At a sufficient volume fraction of this additive, a controlled interparticle contact between the Ohmic particles is achieved which produces macroscopic conductivity throughout the bulk of the medium. A proper balance between the macroscopic conductivity and density produce materials which can exhibit excellent absorptive properties over a wide band, typically between 2 to 18 GHz. This is but a rather narrow part of the entire microwave frequency band. The effective bandwidth is a result of employing an Ohmic loss mechanism in that Ohmic losses produce a hyperbolic frequency dependent loss factor. Thus, at low frequencies, the losses are so great that a degredation in surface reflection properties are produced while at high frequencies, the loss is so small that the material is not absorptive enough to prohibit high transmission and subsequent rereflection of an incident electromagnetic wave.

Typically, carbon powder or foamed forms of carbon or resistive sheets have been used and structures built from them produce excellent absorptive properties between 1 to 20 GHz in the microwave frequency band. In general, an electrically homogeneous material exhibiting a specific level of Ohmic conductivity can only produce good reflection loss over a narrow frequency band. Combinations of materials having different impedances may be used to covet wide parts of this band. Extremely thick shaped profiles are also used to produce broad-banded behaviour, especially at MHz frequencies.

Nature, however, offers another type of loss mechanism, dielectric relaxation. Dielectric relaxation is not an Ohmic process and is based on the fact that small molecules having a dipole moment totate in the presence of a modulating electromagnetic field. Theoretically, the process is described by the "Debye relaxation process". The most common example of the use of dielectric relaxation in the absorption of microwaves is microwave drying and heating microwave heating and cooking is done in almost every household world wide. The size of the molecule and its dipole moment govern where maximum interaction with the field will occur and thus the frequency span of absorption of microwave energy and its transformation into thermal heating. Various physical limitations are associated with the exhibition of dielectric losses in materials.

Firstly, for rotation to occur, the molecules must be free to do so. This limits the material to liquids or gasses. The size of the molecule is associated with this in that size (inertial effects) requires that the molecule has a low inertia enabling it to rotate in phase to some extent with the electromagnetic radiation. Such small molecules are typically gasses and liquids as based on their melting or boiling point. Gasses ate typically too dilute to be of any use as a microwave absorber and are in any case hard to confine. Liquids, even though they are a condensed phase are typically too dense to be used as a microwave absorber. Most substances do exhibit some degree of dielectric telaxation, however, the absorption may not be as efficient as others.

Although the effect one is trying to achieve in microwave absorption is similar to that used in microwave heating or cooking, it should be realised that although many substances such as food stuffs absorb microwave energy, no food stuff or any natural substance in itself is designed by man to absorb microwave energy efficiently or maximally.

It has been known for quite some time that water, disposed in the form of an aerosol or fine droplets can attenuate microwave tadiation without producing a high initial reflection as water would in its dense state. Rain most certainly is not a stable structure as it is susceptible to gravity and wind, its density cannot be controlled widely and otherwise has to be continually generated.

It is an object of this invention to provide a novel type of electromagnetic energy adaptation material.

SUMMARY OF THE INVENTION

According to the invention, an electromagnetic energy adaptation material, which can absorb electromagnetic energy, includes a mixture of at least one liquid with at least one surfactant.

The liquid may be a dipolar molecular liquid.

The dipolar molecular liquid may be water.

The dipolar molecular liquid may be a glycol.

The mixture may have been pressurised by means of a gas.

The mixture may have been foamed by mechanical means.

The gas may be an emulsifiable gas.

At least one surfactant may be ionic.

At least some surfactants may be ionic and non-ionic.

At least one surfactant may be non-ionic.

The mixture may include a base agent neutralising the ionic surfactants at least partially.

The mixture may include a soluble polymer.

The mixture may include in situ cross-linkable monomers of any molecular weight.

The mixture may include soluble dyes.

The mixture may include water dispersible dyes.

The mixture may include water dispersible pigments.

The mixture may include viscosity modifiers.

The emulsifiable gas may include short chained alkanes.

The alkane may be butane.

The alkane may be propane.

The mixture may include at least one humectant.

The material may be a foam.

The material may be a gel.

The material may be adapted to alter the reflection or emission of electromagnetic energy.

Further according to the invention there is provided use of an electromagnetic energy adaptation material as set out herein in the form of a foam for covering an object to prevent detection thereof by an electromagnetic energy detection apparatus, such as radar equipment.

The electromagnetic energy adaptation material may be in the form of a foam for covering an object to prevent detection thereof by thermal detection equipment.

The electromagnetic energy adaptation material may be used in the form of a foam for covering an object to prevent detection thereof by laser detection equipment.

Also according to the invention, a method of minimising or altering detection of an object by means of electromagnetic energy detection apparatus, includes the steps of coating such an object at least partially by means of a foam of an electromagnetic energy adaptation material as set out herein.

Further according to the invention, a method of minimising or altering detection of an object by means of electromagnetic energy detection apparatus, includes the steps of coating a zone spaced away from such an object at least partially by means of a foam of an electromagnetic energy adaptation material as set out herein.

The method may be applied to camouflage objects for military purposes.

Water is the small dipolar molecule which exhibits loss based on the dielectric relaxation mechanism. Other small dipolar molecules in the class of glycols may be included or even replace water in the general formulation. A foaming agent is defined as the material causing the medium to expand after release from a pressurised container allows the foaming agent to undergo a phase transformation from an emulsifiable liquid into a gas. Suitable foaming agents are typified by butane and propane or mixtures thereof. The surfactant stabilises the liquid/gas mixture so that gravity and surface tension forces are minimised enabling the foam to retain its structure for prolonged periods of time without collapse.

Humectants (e.g. polyhydric alcohols, mannitol, sorbitol, glycerol and xylitol) also serve to prolong the lifetime of a water based foam in that they reduce evaporation. The structure of the foam consists of a continuous liquid phase termed the 'foam concentrate' and a discontinuous gas phase called the 'gas phase'.

foam's origin is also part and parcel of the ultimate function and purpose of the foam itself. For example, if the foam employs propane as the foaming agent then the mixture of liquified propane and foam concentrate is the parent of the foam, i.e., it's precursor. Thus, the parent material may only exist by way of its container, as all anticipated end use scenarios would apply to atmospheric pressure conditions.

BRIEF DESCRIPTION OF DRAWINGS

The invention will now be described by way of example with reference to the accompanying schematic drawings.

In the drawings there is shown in.

DETAILED DESCRIPTION OF DRAWINGS

Water is an excellent choice for the small dipolar molecule exhibiting dielectric relaxation although it is not the only choice. Water's dielectric properties have been fully characterised. In its liquid form, and water is known to be a good reflector of microwave energy.

Figure 1:
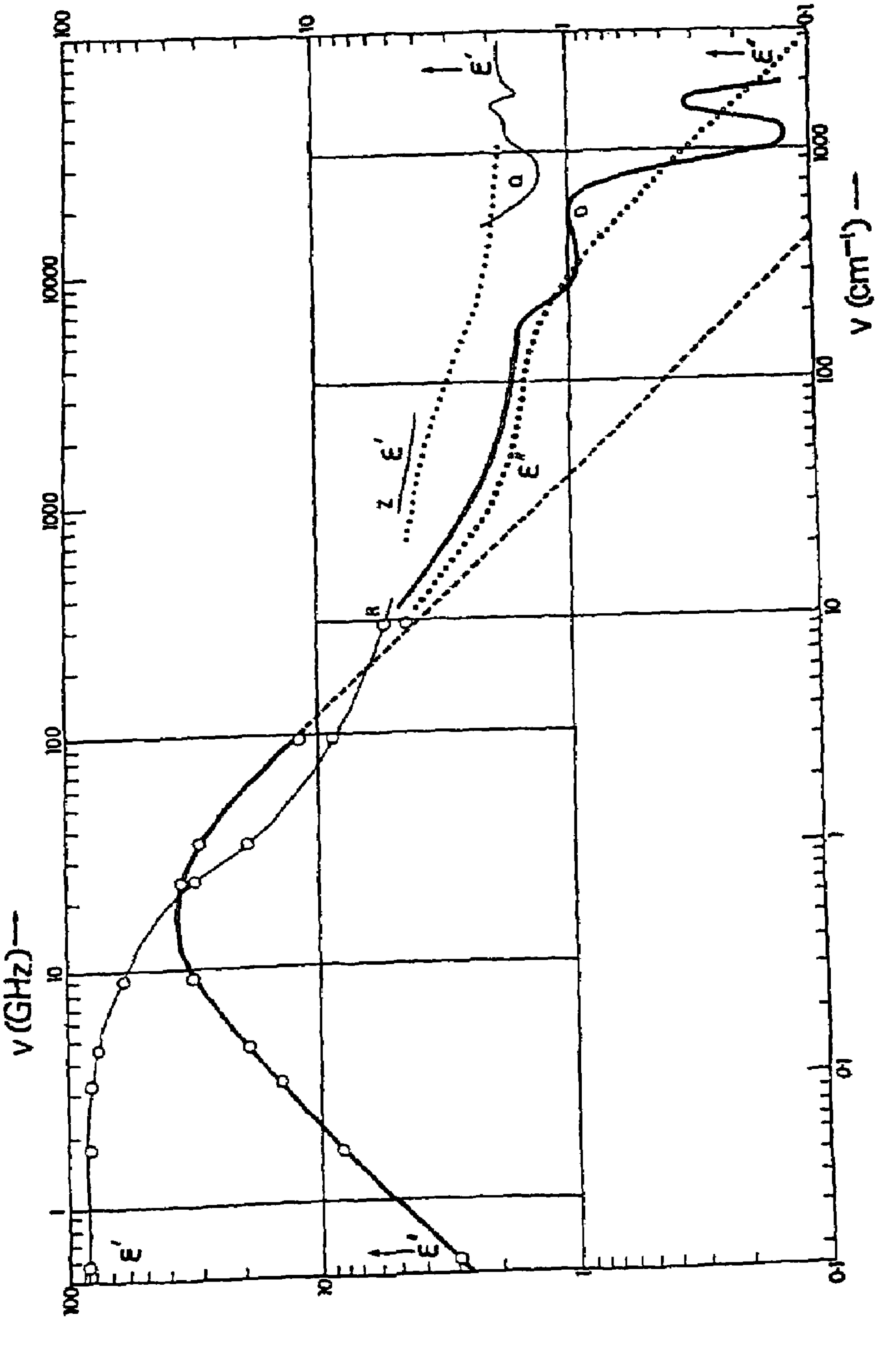
Prior Art FIG. 1
FIG. 1: composite data as shown in Hasted, "Aqueous Dielectrics", page 57, FIG. 2.8, Chapman and Hall, 1973 in which frequency variation of $\epsilon'$(single line and open circles) and $\epsilon''$ (double line and open circles) for liquid $H_2O$ at 25° C., broken double line represents the contribution of the principal relaxation time to $\epsilon''$, and dotted lines (open dots for $\epsilon''$, closed for $\epsilon'$) represent a first attempt to fit the second relaxation process.

The composite data in FIG. 1 (Page 57, FIG. 2.8, Hasted, "Aqueous Dielectrics", Chapman and Hall, 1973) indicates that water would be a good reflector of microwave energy up to frequencies of 1000 GHz. The symbols used indicate the following:

$\epsilon'$=real part of dielectric constant $\epsilon''$=imaginary part of dielectric constant $\nu$=frequency.

The lossy part of the dielectric constant ($\epsilon''$) exhibits an extremely wide bandwidth in frequency, between 1 GHz to 500 GHz. Thus dielectric relaxation is an intrinsically wide band phenomenon unlike Ohmic losses. What is not obvious is that values of the complex permittivity for water useable for absorptive duties can be realised if water is expanded or foamed up thus diluting the water with an expansion agent and reducing-is its high complex permittivity. Expansion factors between 2 and 200 kg/m$^3$ accomplish this.

It is not possible to attain an aerosol of water droplets having these densities. It is possible to foam water up so that is exhibits suitable and efficient microwave absorptive characteristics between 2 and 120 GHz.

Suitable foams may be commercially available shaving creams, carpet cleaners, fire fighting foams, garbage dump foam, or detergent foam, or any other suitable foam.

The density and thickness of the foam are extrinsic parameters that can be controlled to suit specific frequencies. Inclusion or replacement of the water with other dipolar molecules furthermore allows an additional means to modify and tune the electromagnetic properties of the foam for duty in other parts of the spectrum.

As the foam can be designed to have a bubble size much smaller than the wavelength of micro and millimeter wave radiation, the complex permitivity in this limit can be shown to be easily modelled using simple mixing formulas such as:

$$\epsilon'_{foam}=1+(\epsilon'_m-1)f \quad \text{equation 1}$$

$$\epsilon''_{foam}=\epsilon''_m f \quad \text{equation 2}$$

$$\epsilon_r=\epsilon'-\epsilon''j \quad \text{equation 3}$$

where the subscript 'foam' is the related quantity for the foamed mixture, the subscript 'm' is the related quantity for the prefoamed active component held under pressure and 'f' is the volume fraction of the active component in the expanded medium, and $\epsilon_r$=complex dielectric constant, $\epsilon''j=\epsilon''\sqrt{-1}$. It has been assumed in the above equation that the dielectric constant of the gas contained in the foam is 1. The above equation applies to specific frequencies up to a point where this simple mixing formula is no longer applicable.

The prescription above described how efficient microwave characteristics can be created by implementing a liquid based foam. Liquid based foams also exhibit other physical attributes that have not been obvious that allow it alter the appearance of a treated object in other parts of the electromagnetic spectrum.

The abovementioned foams are also excellent thermal insulators. While performing a duty in the microwave and millimetre wave part of the spectrum, a hot body covered by the foam will appear to be at the temperature of the foam as thermal infrared sensors will pick up the surface temperature of the foam. Being a good thermal insulator, it will take a prolonged period of time before heat from the coated surface diffuses outwards towards the surface of the foam. Otherwise, liquid based foams exhibit black body characteristics as most liquids exhibit emissivities close to 1.

The apparent thermal infrared temperature of the foam will be nearly its actual temperature and thus the apparent temperature of any object may be altered by treatment with a foam having the desired temperature. An objects apparent temperature may be controlled in the same way for duty in the 3 to 5 micron mid infrared region.

This same water based foam can be used to suppress reflection of near infrared and visible electromagnetic waves if suitable dyes or pigments are incorporated into the prefoamed mixture.

In the visual part of the electromagnetic spectrum, the selective reflection and absorption of radiation imparts colour. It has been shown that if water soluble or water dispersible dyes and/or pigments are incorporated into the foam concentrate, the complex permittivity in the microwave region is not substantially changed. The properties of the 'coloured' foam in the optical region and near infrared take on the character of the incorporated dye or pigment. Dyes active in the optical region can make the foam cloak have a camouflage appearance. These dyes or pigments can be bled into the feed stream in a controlled fashion during deployment and in this way colour patterns can be built up.

In this way, a truly 'DC to daylight' (DC being zero frequency) can be designed from a surfactant stabilised aqueous foam. This material can be called a "multispectral" foam as its properties are designed to control reflection or the interaction of electromagnetic radiation over a wide part of the electromagnetic spectrum either through its permittivity or by way of other electromagnetic characteristics associated with the foamed structure itself or its composition.

A foam material that simultaneously reduces reflection in the microwave through millimetre wave frequency band controls effective temperatures in the 12 to 3 micron infrared and, by way of incorporated dyes or pigments, changes the colour of the foam so as to create a camouflage pattern not known previously.

It has been found that the surfactant and other additives do not degrade the desirable characteristics that would be exhibited by a pure form of foamed water. The main effect on the microwave properties is to decrease the relaxation time of the water molecule due to an increase in the viscosity of the water (Journal of Chemical Physics, E. H. Grant, Volume 26, page 1575, 1973). In fact, an increase in viscosity could be an advantage in low frequency applications in that the relaxation time is increased thus causing the loss factor to be higher at lower frequencies.

Typically, a surfactant stabilised foam would not only contain water as the main constituent, but soluble polymers in addition to the surfactant. These soluble polymers thicken the foam increasing its longevity against drainage and its ability to stick well to any substrate. Such polymers could be polyacrylic acid, polyvinyl alcohol, guar gum and many others. Inorganic material like bentonite, a thixotropic agent may also be used. A hydrophobic grade of fumed silica as additive migrates to the surface as the foam dries out improving the colour and surface texture of the foam thereby altering the surface structure and colour and thus compensating for colour changes occurring when the material dries out.

The soluble polymer or surfactant additives may influence the microwave properties of the foam in two ways. Firstly, it increases the viscosity of the aqueous phase thus reducing the relaxation frequency and, secondly, it can increase or decrease the permittivity of the foam depending upon its intrinsic permittivity.

A "water-based multispectral foam" is one which may contain water as the principal component and in addition, substances falling into a general class of chemicals as listed below:

1) surfactants, both ionic and non-ionic;
2) soluble polymers or in situ crosslinkable monomers of any molecular weight;
3) a base to neutralise or partially neutralise the ionic surfactant;
4) soluble dyes or water dispersible pigments or dyes;
5) other pure substances which are soluble in the liquid base that either improve or otherwise alter the overall permittivity of the mixture, e.g. by way of viscosity modification;
6) a gas which could be air, light hydrocarbon liquids such as butane or any other gas or liquid which either acts as the blowing agent and/or propels the mixture out of a container;
7) all of the above contained at the right temperature dispersed as a foam.

DESCRIPTION OF EXAMPLES

The invention will now be described by way of examples as set out below.

Figure 2:
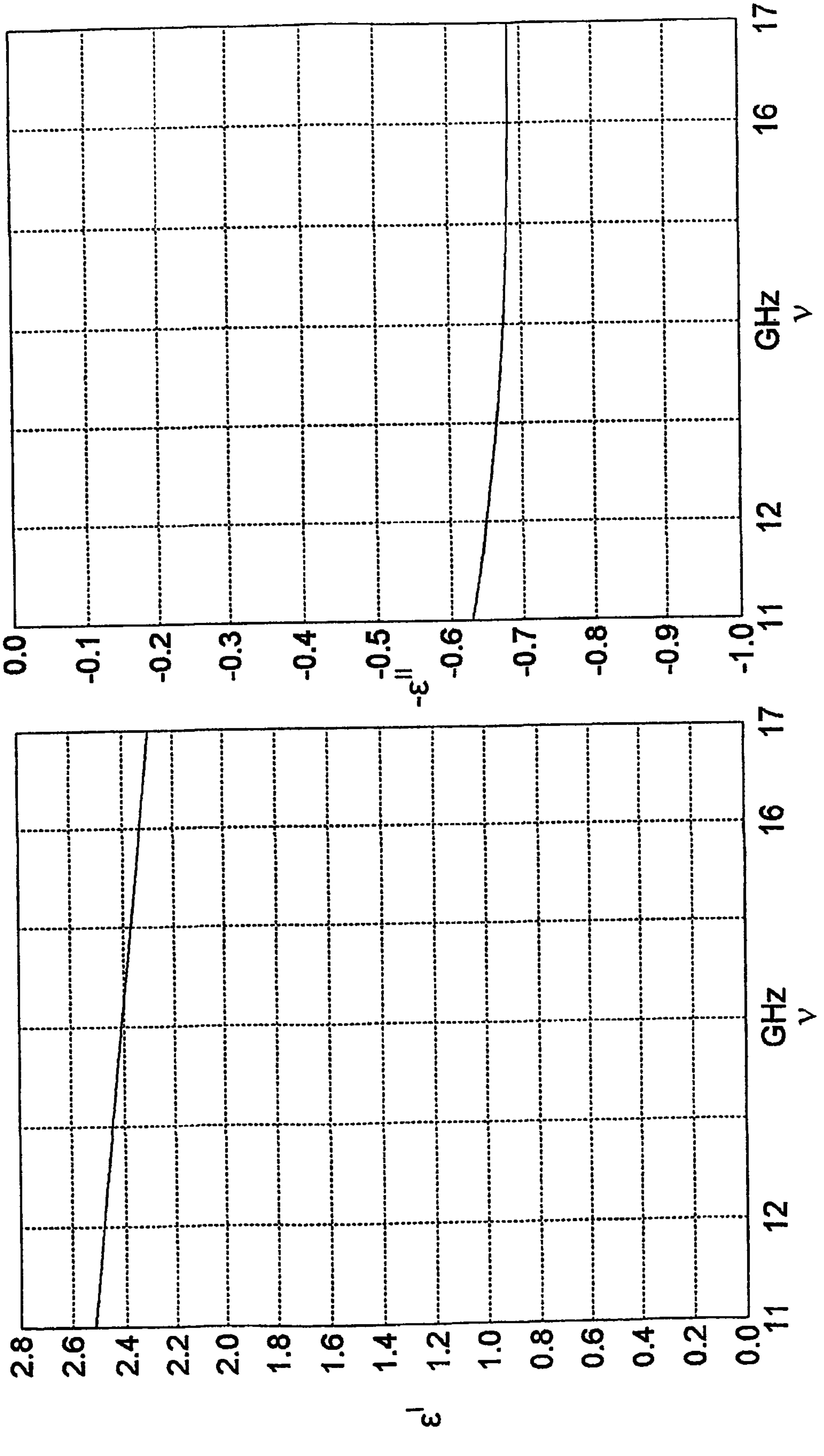
FIG. 2: permittivity of a foam.

In FIG. 2 is shown the permittivity of a conventional shaving cream in the 11 to 17 GHz band. The density for this freshly foamed material is about 70 kg/m$^3$. This shaving cream has about a 12 weight % solids content and thus is about 88% water. Thus this foam consists of approximately 93% expansion agent.

Based on simple effective medium theory calculations using data for pure water taken from the Hasted reference, it is possible to predict the complex permittivity for a water/air mixture containing 93 volume % air.

At a single frequency of 12.82 GHz for example, predictions give the value for the real part of the permittivity to be 3.1 and the imaginary part to be 2.42. Comparing this with the measured values of the foam material at the same frequency (2.48-0,65j) yields an over estimation for the teal part and an over estimation for the imaginary part. It is felt that the difference is due to the viscosity related change in relaxation frequency which has shifted the complex part of the dielectric constant to lower values. The soluble polymer is also responsible for increasing the dielectric constant to higher values, however, the surfactant and any polymeric additives are at relatively small quantities to effect the dielectric constants directly.

Another way to compare these measurements with what has been measured for pure water is to consider the ratio of the imaginary part of the dielectric constant to the real part, i.e., tan (delta), being $\epsilon''/\epsilon'$. For pure water at 12.82 GHz, tan(delta) is 1.1.

Figure 3:
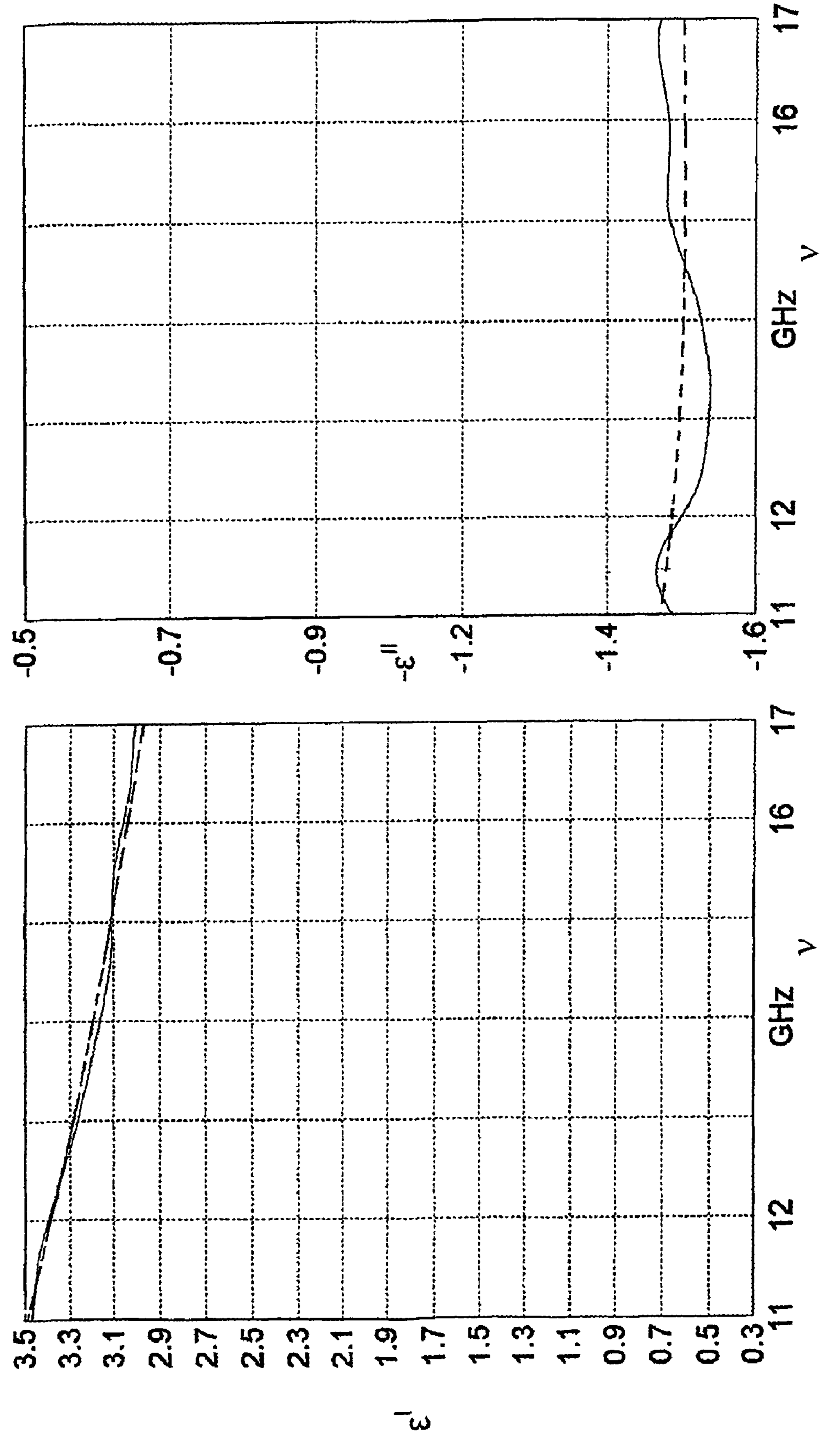
FIG. 3: the permittivity of the same foam as in FIG. 2 but admixed with a water soluble ink solution, wherein the solid line represents the permittivity actually measured and the dash line represents an average over the measured frequency.

In FIG. 3 is shown the permittivity of the same foam containing 1 volume % water soluble ink solution. Tan (delta) for this material was measured to be 0.45. This is an increase in tan (delta) from the foam without ink of 0.33. This increase may not be entirely due to the ink itself but also to the admixture of the solvent the ink solution contains.

Figure 4:
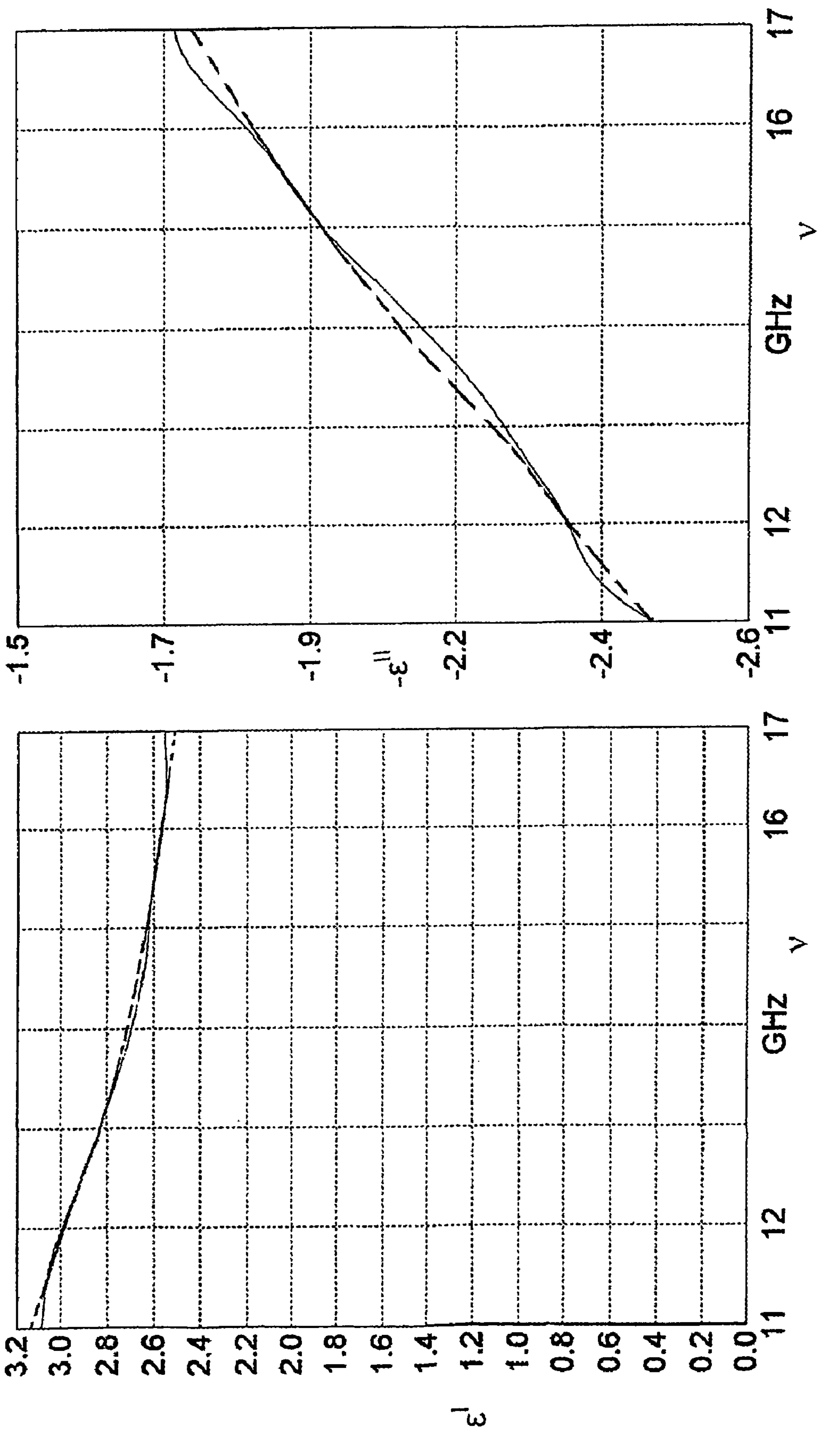
FIG. 4: the permittivity of the same solution as in FIG. 2 but admixed with methanol, wherein the solid line represents permittivity actually measured and the dash line represents an average over the measured frequency.

FIG. 4 shows the permittivity measured data on the foam where 20 weight % methanol has been added. Tan (delta) in this case is 0.8, a dramatic increase over that of nascent foam. Methanol has a relaxation frequency in its pure state at about 3.5 GHz. Together with the water based component, the magnitude of the complex part of the permittivity has now increased tan (delta).

The data above was measured on a conventional cosmetic product, namely shaving cream. This product consists of an unknown composition and because it is canned only for the purpose for which it was intended, one cannot change the formulation to suit specific requirements. Because the shaving cream was designed for human skin contact, it contains a number of additives that may not be necessary for the practicing of this art.

The next series of experiments that are reported below use a general and home-made formula that is canned with different additives and gas loads. The concentrate consists of:

| | | |
|---|---|---|
| 1) water: | 85.31 | weight % |
| 2) non-ionic surfactant: | 7.31 | weight % |
| 3) ionic surfactant: | 2.04 | weight % |
| 4) humectant: | 2.03 | weight % |

-continued

| | | |
|---|---|---|
| 5) base to pH 6.5: | 0.223 | weight % |
| 6) long chain alcohol: | 3.07 | weight % |
| 7) Butane/propane (30:70) mixture | variable | weight % on total liquid. |

The concentrate contains approximately 15 weight percent solids.

Figure 5:
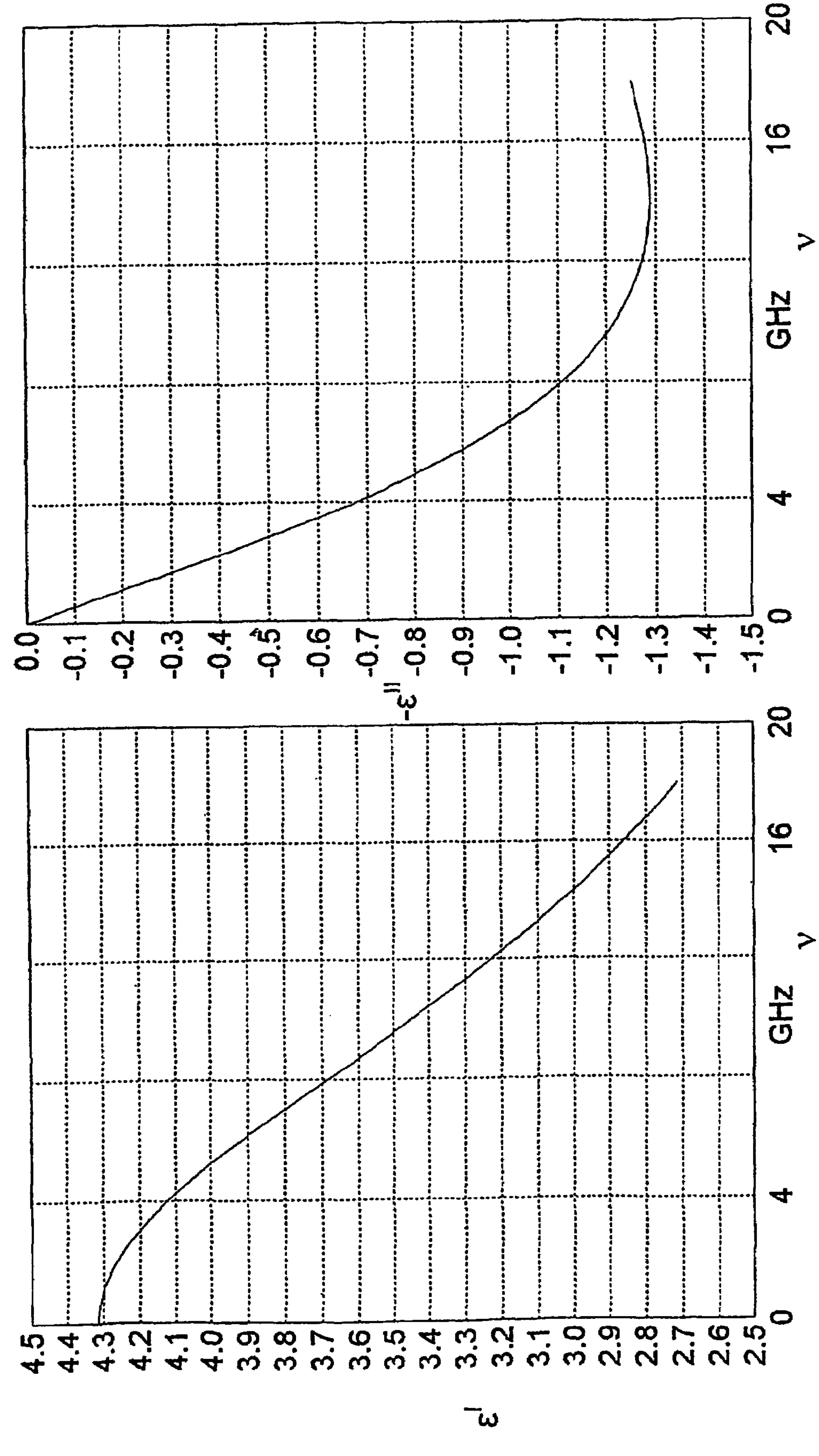
FIGS. 5-11: permittivity of various samples in accordance with the invention.

FIG. 5 (sample 1) below shows the permittivity (measured in a coaxial sample holder) of a 98 gram load of the concentrate loaded with 2 grams of liquid butane/propane (vapour pressure 40 kilo pascal).

Figure 6:
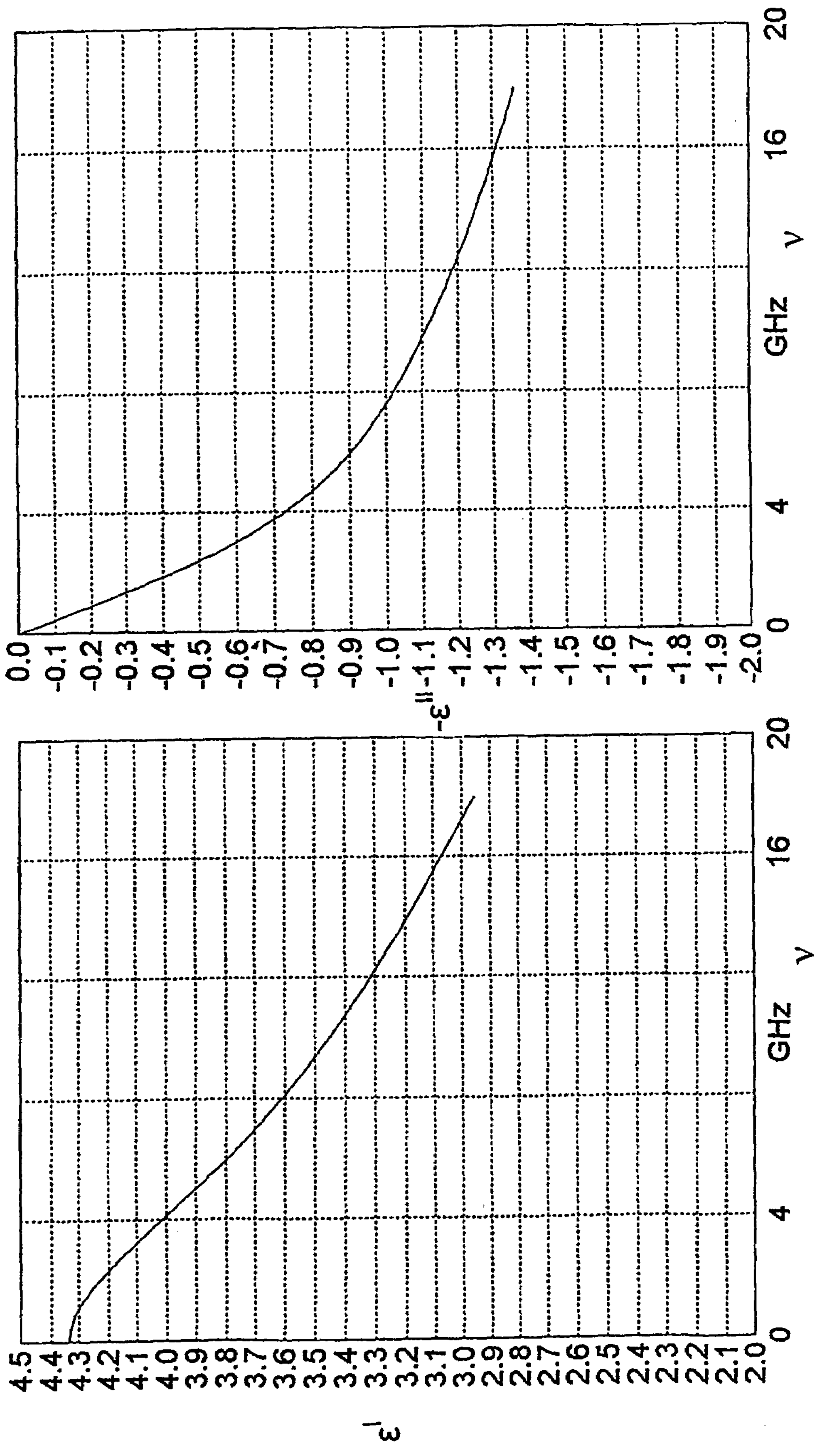

FIG. 6 (sample 2) is the same foam concentrate as in sample 1 loaded with 3 grams of liquid butane/propane (vapour pressure 40 kilo pascal).

Figure 7:
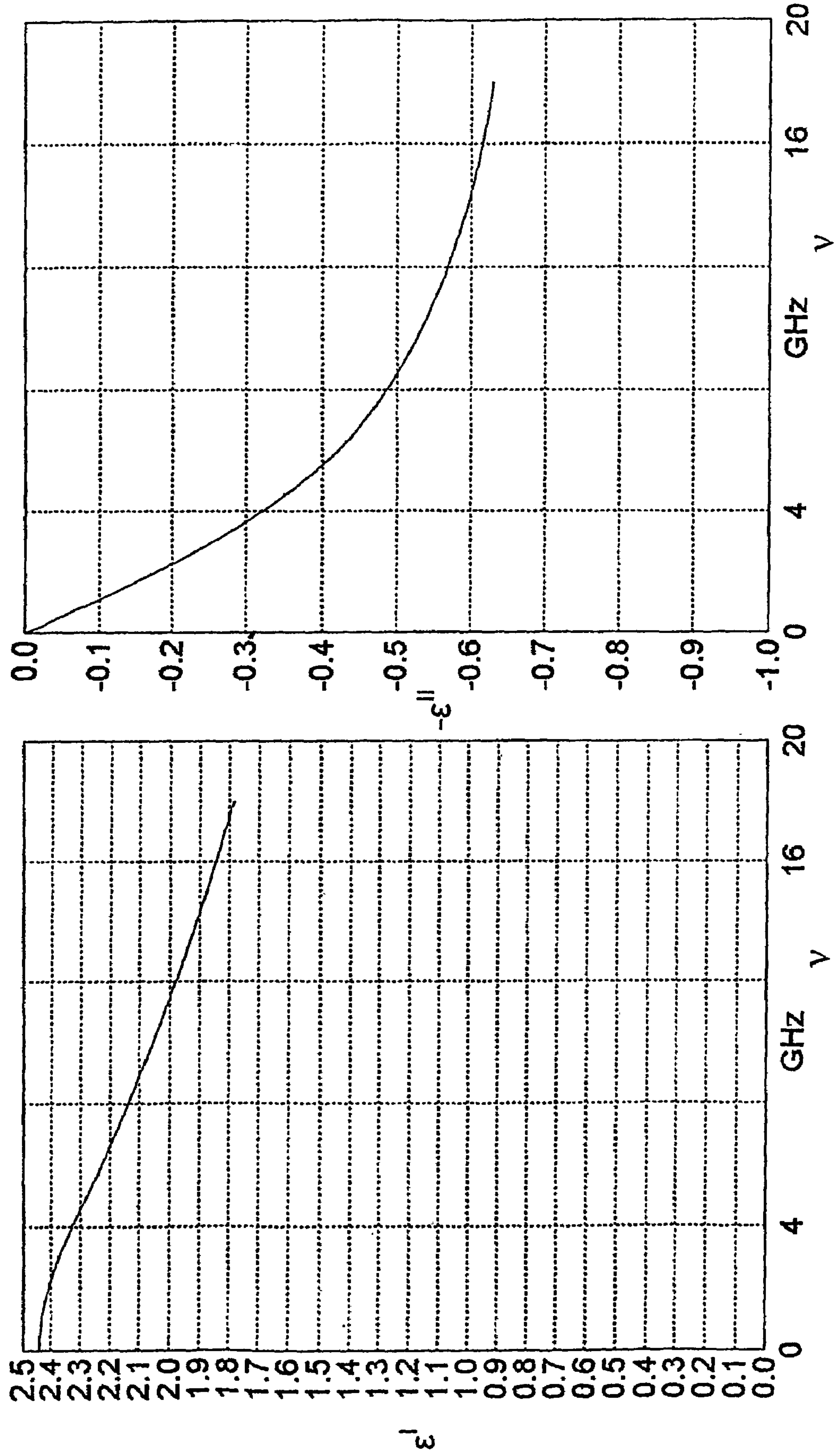

FIG. 7 (sample 5) is the same foam concentrate as in sample 1 loaded with 6 grams of liquid butane/propane (vapour pressure 40 kilo pascal).

Figure 8:
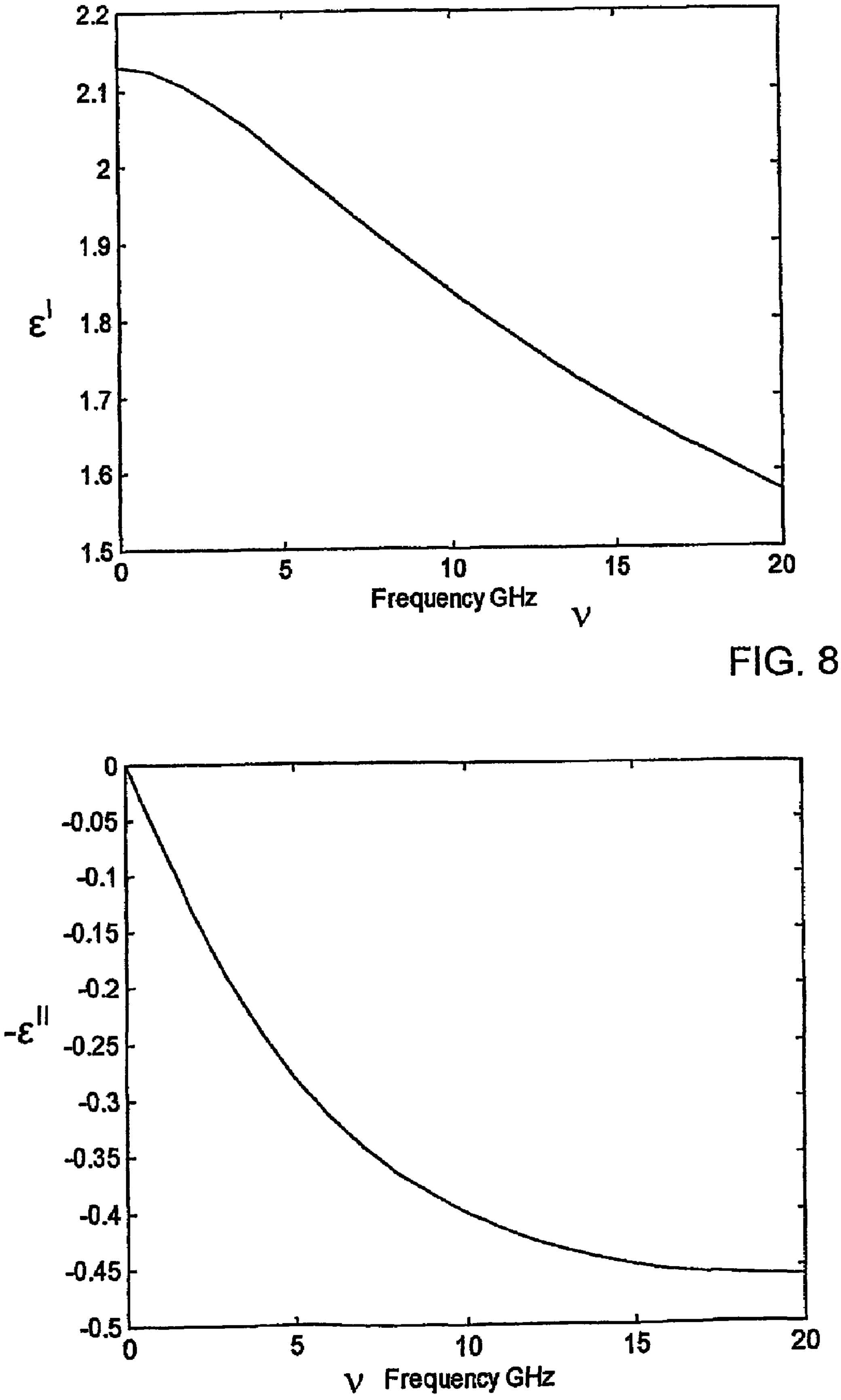

FIG. 8 (sample 6) is the same foam concentrate as in sample 1 loaded with 7 grams of butane/propane (vapour pressure 40 kilo pascal).

The data shown in FIGS. 5 through 8 demonstrates how the permittivity of the foam can be controlled through the amount of liquid butane used as the blowing agent and expulsion medium. This determines the ultimate density of the foam.

To further demonstrate the flexibility in the above formula, it has been shown that the water in the above formula can be replaced by sea water without effecting optimal properties.

It is not enough to make a foam having desirable permittivites. The same foam must also be mechanically stable and have longevity, retaining its water content and cellular structure for long periods of time.

Table 1 summarizes typical densities achieved.

TABLE 1

| Grams of foam concentrate | grams butane 40 | foam density (kg/m$^3$) |
|---|---|---|
| 98 | 2 | 126 |
| 98 | 3 | 112 |
| 96 | 4 | 77 |
| 97 | 5 | 54 |
| 96 | 6 | 49 |
| 97 | 7 | 37 |

Although a wide range of densities can be obtained by control of the expansion agent concentration, those reported in Table 1 are perhaps the most valuable.

Other substances can be added to the foam concentrate in an effort to pigment the foam so that it can also operate as an absorber of near infrared and visible electromagnetic waves. The Figures show how these additives effect the microwave permittivity.

Figure 9:
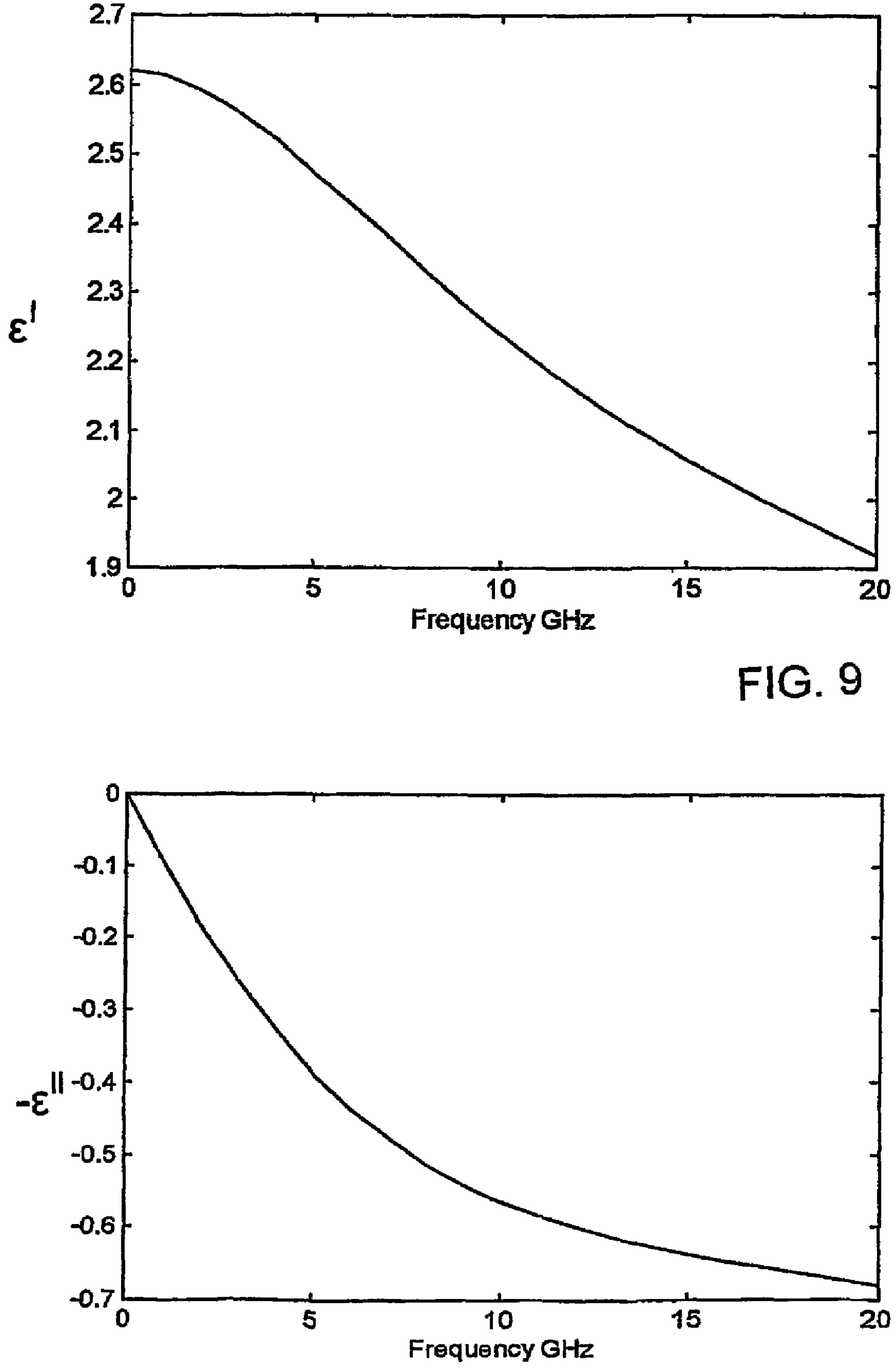

In FIG. 9 (sample 7) is shown the permittivity of a sample consisting of 100 grams of foam concentrate and 0.71 grams of ‘multi-dispersal carbon black’. This pigment is a dispersion of carbon black in water and ethylene glycol having a 42 weight % solids content. The carbon black was milled down to below 5 microns. 97 grams of the multi-dispersal black/foam concentrate was canned with 5 grams of butane/propane (vapour pressure 40 kilo pascal). The resultant density was 54 kg/m$^3$.

Figure 10:
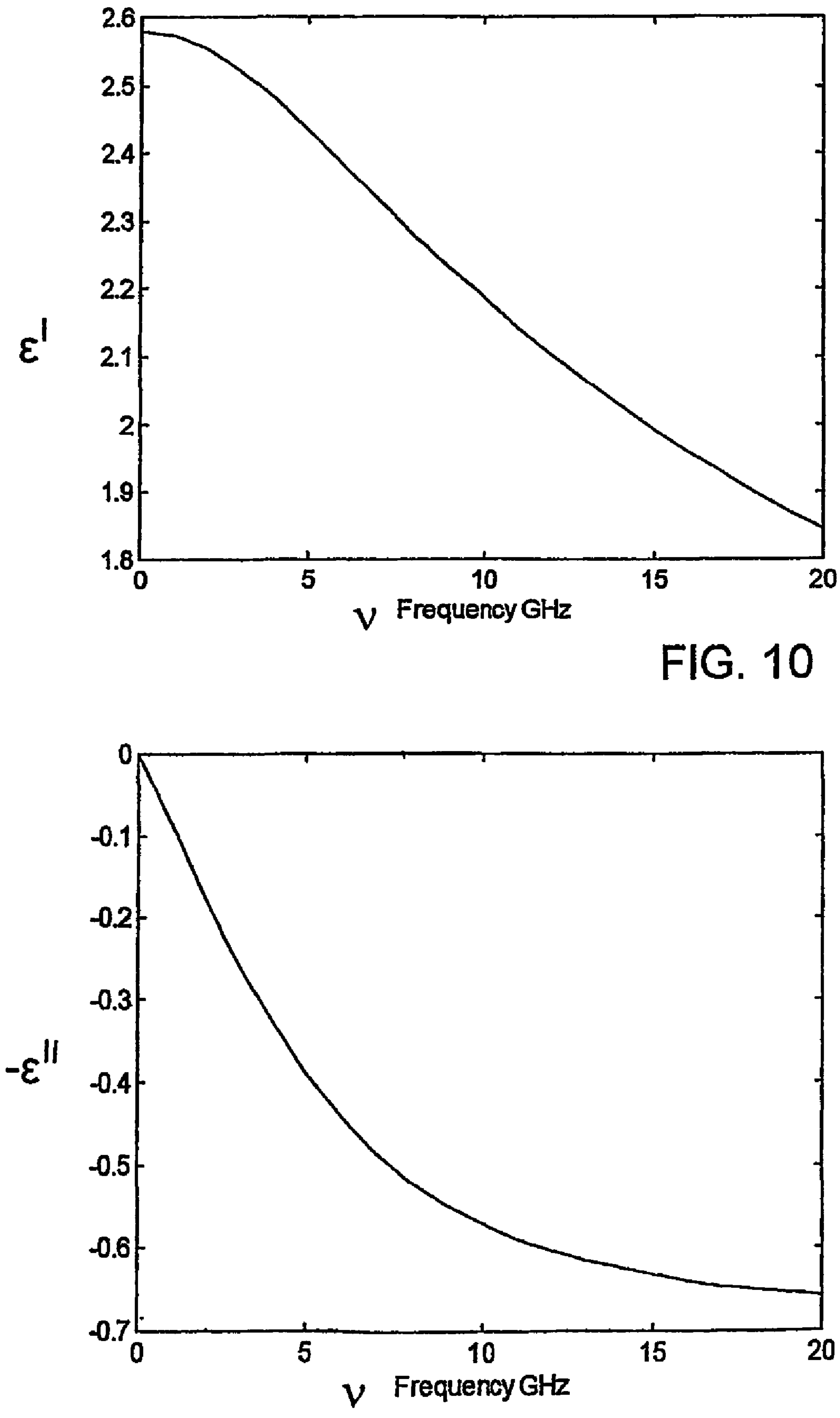

FIG. 10 (sample 8) shows the permittivity of a sample consisting of 100 grams of the foam concentrate and 1.77 grams of the multi-dispersal black pigment. 100 grams of this mixture was canned with 5 grams of butane/propane (vapour pressure 40 kilo pascal). The resultant density was 52 kg/m$^3$.

Figure 11:
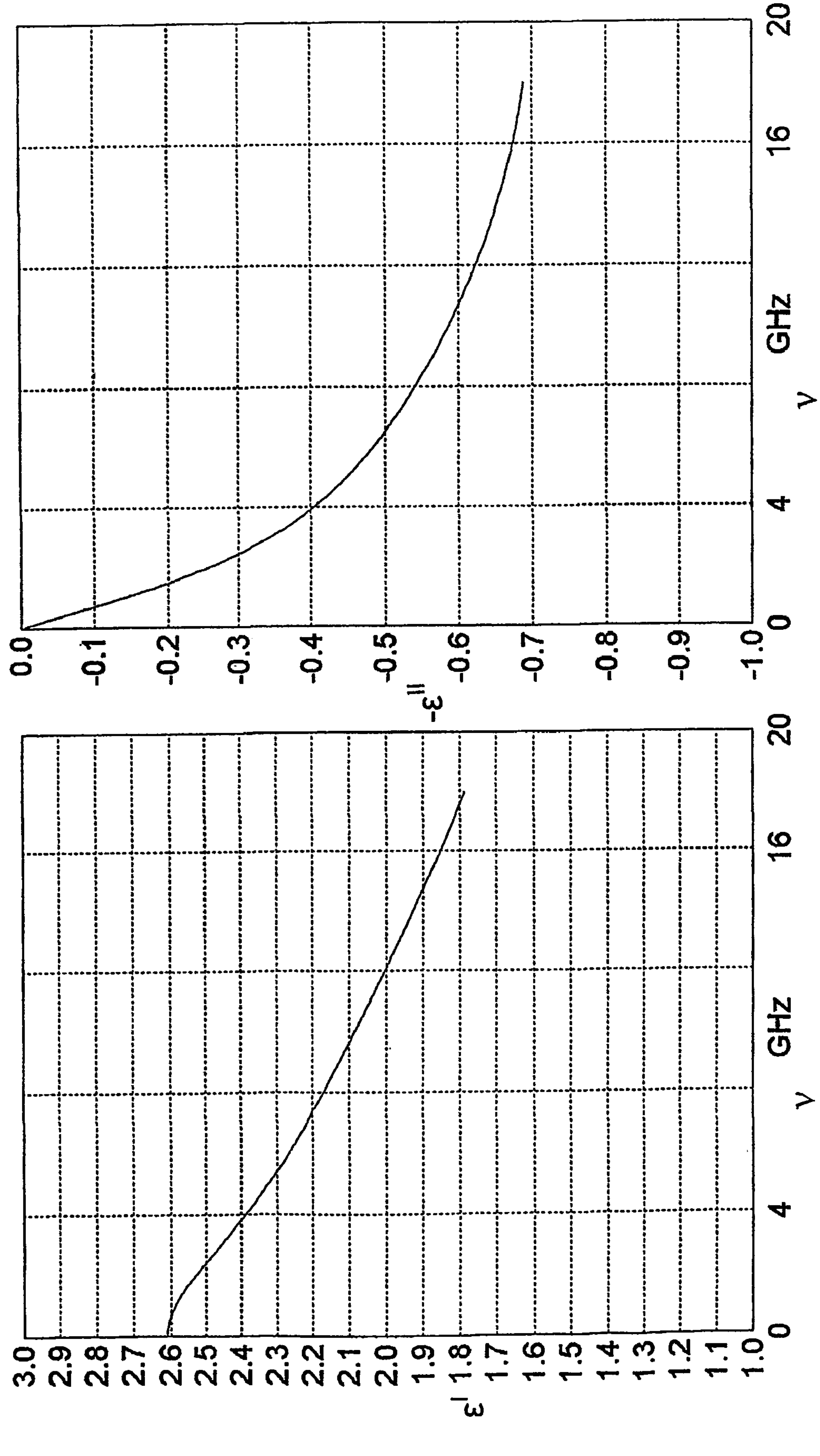

FIG. 11 (sample 9) shows the permittivity and permeability of a sample consisting of 100 grams of foam concentrate mixed with 8.89 grams of 'multi-dispersal iron oxide black' produced by the same company. The iron oxide (magnetite) was milled down to below 0.5 microns and dispersed in water/ethylene glycol solution to 60 weight %. 100 grams of this pigment/foam concentrate was canned with 5 grams of butane/propane (vapour pressure 40 kilo pascal). The resultant density was 62.7 kg/m$^3$.

To further demonstrate the wide variety of properties accessible by liquid based foams, one can prescribe a 'winter formula' for use to temperatures as low as −15 degrees C.

| | | |
|---|---|---|
| 1) water: | 54.39 | weight % |
| 2) non-ionic surfactant: | 6.83 | weight % |
| 3) ionic surfactant: | 1.91 | weight % |
| 4) humectant: | 1.89 | weight % |
| 5) base to pH 6.5: | 0.208 | weight % |
| 6) long chain alcohol: | 2.87 | weight % |
| 7) antifreeze: | 31.88 | weight % |
| 8) propane | 5 | weight % on total liquid |

Another formulation with superior properties below 5 GHz, and one that also is applicable to sub-zero temperatures is:

| | | |
|---|---|---|
| 1) antifreeze: | 87.31 | weight % |
| 2) non-ionic surfactant: | 7.31 | weight % |
| 3) ionic surfactant: | 2.04 | weight % |
| 4) base to pH 6.5: | 0.223 | weight % |
| 5) long chain alcohol: | 3.07 | weight % |
| 6) propane | 5 | weight % on total liquid |

This example demonstrates that the foam need not contain water at all.

The reflectivity loss that can be achieved if a flat metal plate is covered with a 30 mm thick even layer of water based foam is explained below. The two samples were measured in a free space facility at between 11 and 17 GHz.

Figure 12:
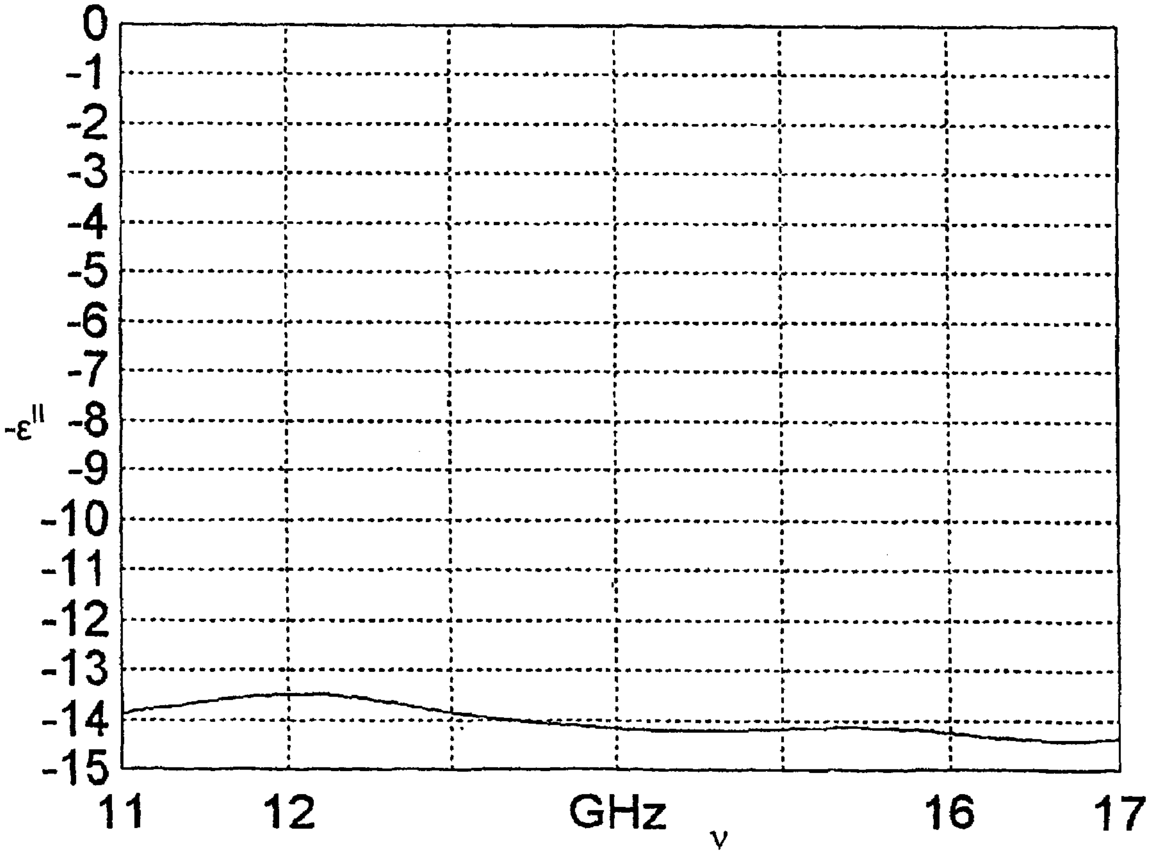
FIG. 12: reflectivity loss of a metal plate covered with foam as referred to in FIG. 2.

In FIG. 12 is shown the reflectivity loss down from a metal plate for the shaving cream at 30 mm thick. This material has a density of 70 kg/m$^3$.

Figure 13:
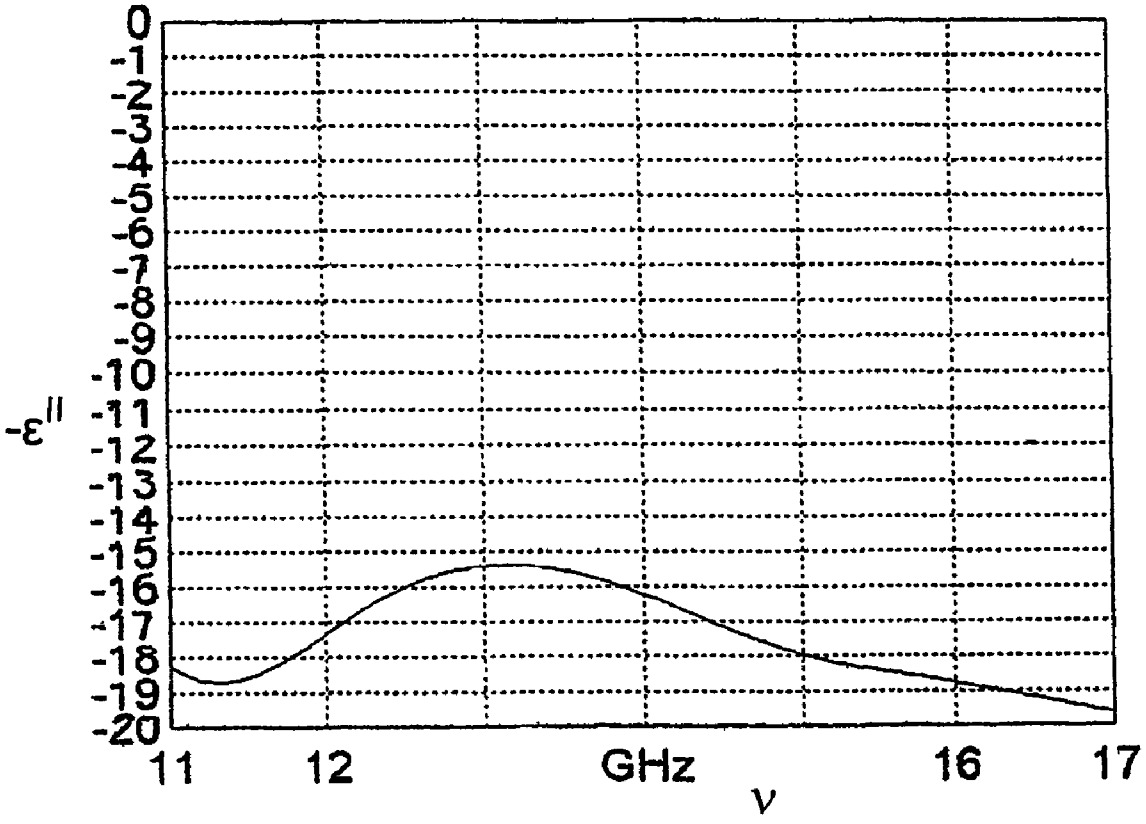
FIG. 13: reflectivity loss of a metal plate covered with air blown foam.

In FIG. 13 below is shown the reflectivity loss down from a metal plate for a sample of fire fighting foam. The foam was air blown and had a density of 50 kg/m$^3$.

It is shown the reflectivity loss that can be achieved if a flat metal plate or a corner reflector is covered or filled respectively, with water based foam. The samples were measured in the free space facility at 94 GHz. The experiment was multipurpose in that the effect of water spray and dust were measured. The order of the event chronology is described in the figure captions.

Figure 14:
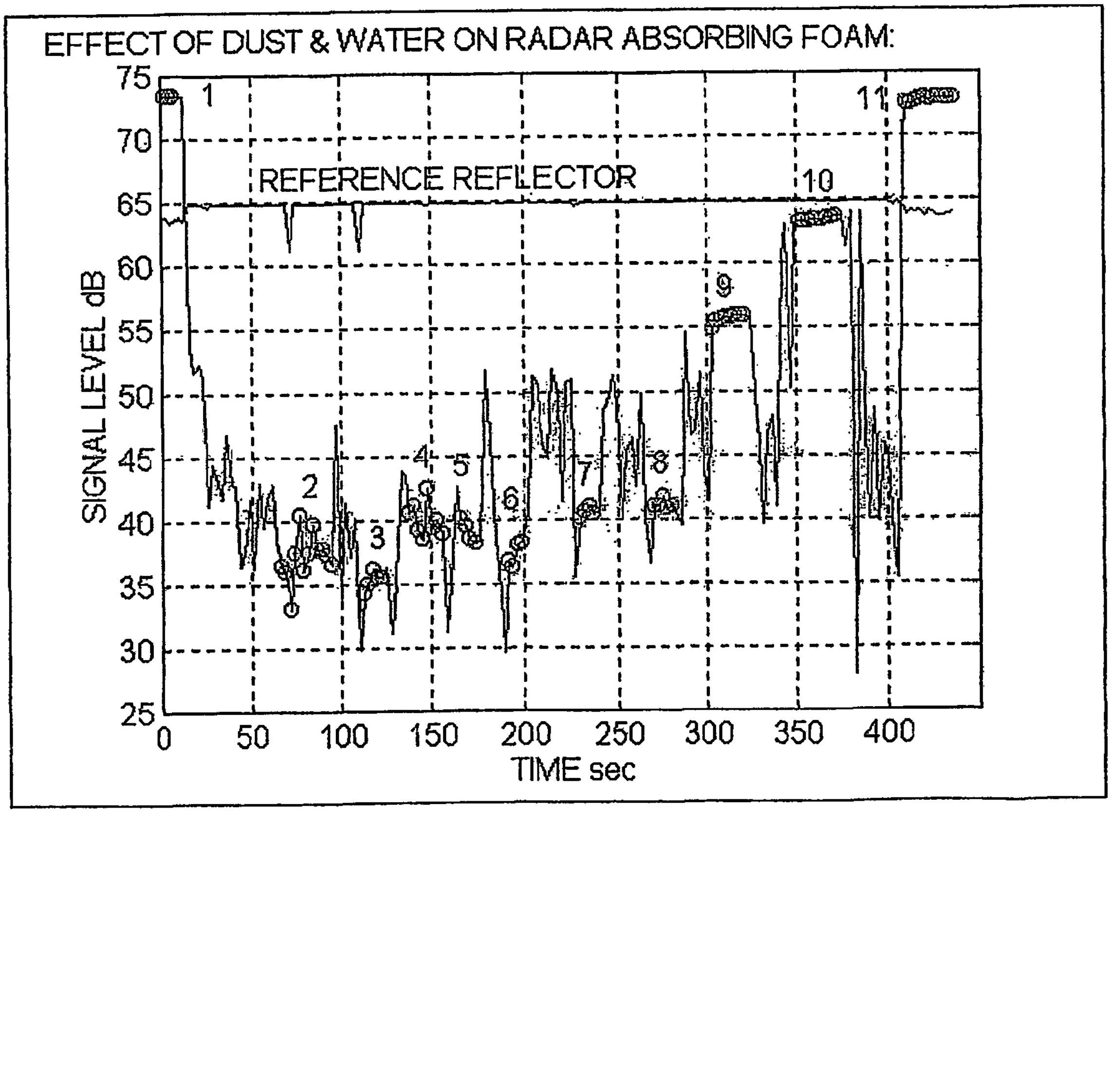
FIG. 14: 94 GHz reflectivity loss of a corner reflector treated with foam.

In FIG. 14 is shown the reflectivity loss down from a 10 m$^2$ corner reflector treated with foam and also tested with dust and water spray. This material has a density of 61 kg/m$^3$.

The references in the graph in FIG. 14 indicate the following:

| Event Chronology References: | | Reflectivity relative to base |
|---|---|---|
| 1: | clean 10 m$^2$ corner reflector (base) | 0 dB |
| 2: | reflector completely filled with foam | −36 dB |
| 3: | heavy layer of dust applied to surface of foam | −38 dB |
| 4: | first water spray | −33 dB |
| 5: | second water spray | −34 dB |
| 6: | third water spray | −36 dB |
| 7: | foam partially removed from reflector | −33 dB |
| 8: | more material removed from reflector | −32 dB |
| 9: | a thin layer of foam left on reflector surfaces | −17 dB |
| 10: | a thin layer of foam left on a single surface | −9 dB |
| 11: | reflector washed clean but still wet | −1 dB |

Figure 15:
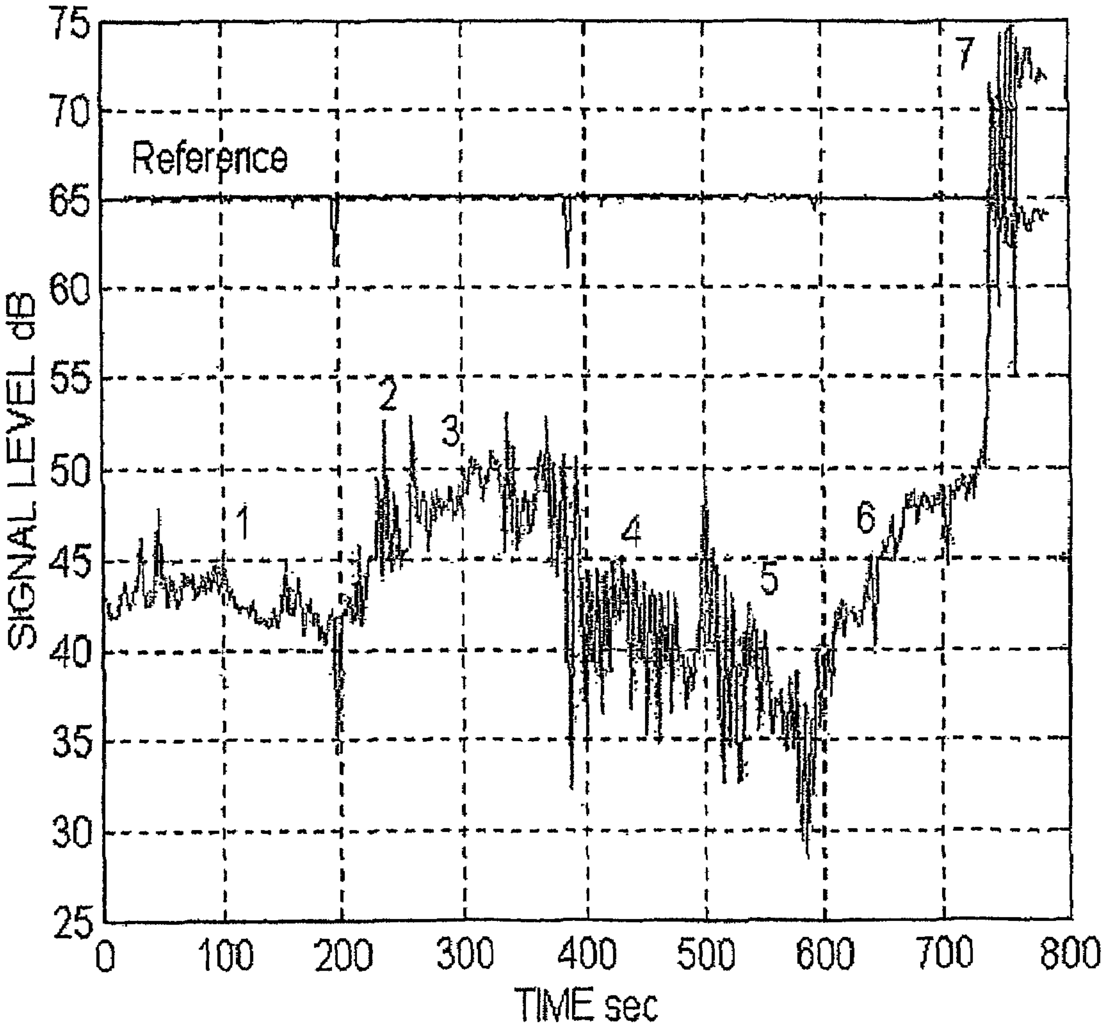
FIG. 15: 94 GHz reflectivity loss of a metal plate treated with foam.

In FIG. 15 is shown the reflectivity loss down from a polished metal plate treated with foam in various ways. The foam density was 30 kg/m$^3$.

The references in the graph in FIG. 15 indicate the following:

| Event Chronology References: | | reflectivity relative to base |
|---|---|---|
| 1: | plate covered with 20 mm of foam | −30 dB |
| 2: | plate oscillating in wind | n/a |
| 3: | foam sliding off plate exposing metal | −20 to −18 dB |
| 4: | foam repaired | −30 dB |
| 5: | water spray applied | −30 to −38 dB |
| 6: | foam sliding off plate exposing metal | −38 to −22 dB |
| 7: | clean plate (base) | 0 dB |

Figure 16:
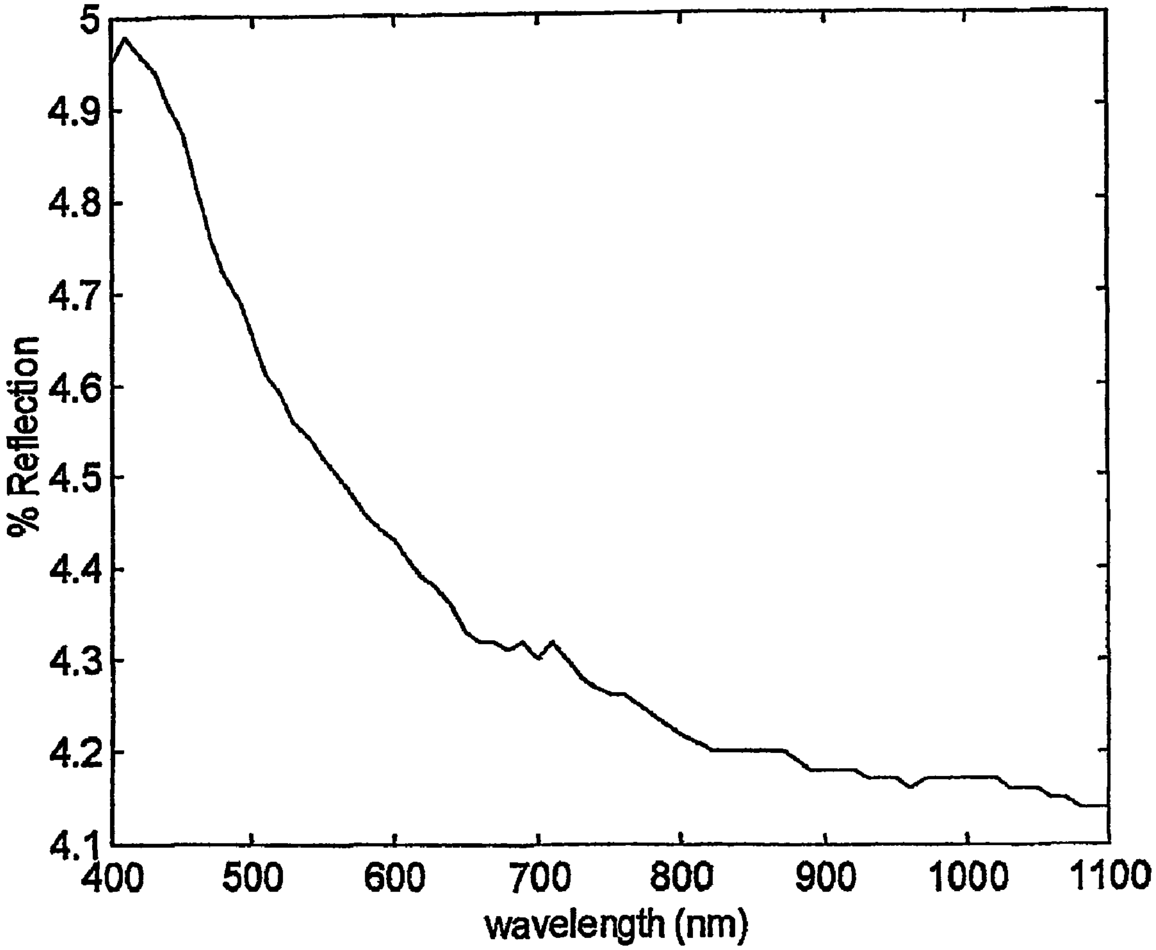
FIG. 16: UV-Visible-near infrared reflectivity of foam dyed with carbon black.

In FIG. 16 is shown the total reflectivity loss in the UV (Ultraviolet) through to the near IR (Infrared) range of frequencies of a sample dyed with carbon black at 2.34 weight %.

The above examples indicate that a degree of control exists in designing surfactant stabilised foams to perform the role of a microwave absorber or as an electromagnetic energy adaptation material. The control parameters such as the expansion factor, amount of surfactant, and the addition of dyes and other small dipolar molecule liquids allow this new material to be engineered to suit a wide variety of absorption characteristics at different frequencies.

In addressing the mechanical integrity issue, it has been demonstrated that foam concentrate mixtures containing soluble polymers provide for a foam stable for over 12 hours without degradation of the effective permittivity, this depending upon the ambient temperature and humidity. In a more advanced formulation, it has been demonstrated that a polyvinyl alcohol based foam concentrate can be blown simultaneously, as a binary charge with a sodium borate solution.

The borate crosslinks the polyvinyl alcohol almost instantly creating a stiff expanded foam with excellent mechanical strength and longevity.

In another formulation, it has been demonstrated that a polyacrylic acid based foam concentrate can be neutralised with ammonium hydroxide up to a critical point where the concentrate is on the verge of gelling.

After blowing the foam, the excess ammonia is free to evaporate into the butane gas filled cells of the foam or out of the foam altogether. The depletion of ammonia from the liquid phase precipitates the acrylic acid polymer producing a stiff expanded gel of exceptional mechanical integrity.

In use, for instance to camouflage an object for military purposes the electromagnetic energy adaptation material is foam-sprayed onto the object, or, in a zone distant from the object, so as to minimise or alter detection of such an object.

In the case of radar detection, the density and the composition of the material, affecting the permittivity, must be controlled so as to achieve lower reflection in the case of a metallic object, or in the case of a cave the cavities are filled up with foamed material resulting in the permittivity of the rock or sand structure.

In the case of thermal detection the temperature of the foamed material must be controlled to have an ambient temperature, or in the case of acting as a decoy, then its temperature should be controlled to be higher than ambient.

In the case of visual detection, the foamed material is pigmentated so as to cause appropriate blending with the surroundings.

The invention claimed is:

1. A method of minimizing or altering detection, for military purposes by electromagnetic detection apparatus, of an object by means of an electromagnetic energy adaptation material, said method comprising at least one of the steps selected from the group consisting of:

(a) coating an object at least partially by means of an electromagnetic energy adaptation material; and (b) coating a zone spaced away from such an object at least partially by means of an electromagnetic adaptation material;

said electromagnetic adaptation material comprises a water-based foam constituted by a liquid-based mixture of at least one dipolar molecular liquid with at least one ionic surfactant and constituting a base agent adapted to at least partially neutralize the ionic surfactant;

said mixture adapted to being held in a container under a pressure higher than atmospheric pressure by an alkane emulsifiable gas and adapted to expand to form the water-based foam after being released from the container as a result of lower atmospheric pressure than the pressure in the container;

said alkane emulsifiable gas including at least one compound selected from the group comprising short-chained alkanes, ethane, butane, propane and mixtures thereof;

said water-based foam having a density of 30-126 kilograms per cubic meter;

said density of the water-based foam being determined by the amount of emulsifiable gas used to pressurize the mixture in the container;

said density determining the microwave and thermodynamic properties of the material;

said material having at least one characteristic selected from the group of characteristics consisting of being adapted to absorb electromagnetic energy, being adapted to alter the reflections of electromagnetic energy, and being adapted to emit electromagnetic energy;

said characteristic being a result of Debye relaxation and blackbody emissivity characteristics of the dipolar molecular liquid and a result of the intrinsic thermal conductivity of the water-based foam based on the density of the water based foam;

said dipolar molecular liquid being at least one compound selected from the group consisting of water, an alcohol, glycol and methanol; and said electromagnetic energy detection apparatus being at least one selected from the group consisting of radar equipment, thermal detection apparatus and laser detection equipment.

2. The method as claimed in claim 1, further comprising providing at least one component selected from the group consisting of soluble dyes, water dispersible dyes, water dispersible pigments and viscosity modifiers to the mixture.

3. The method of claim 1, wherein the alkane emulsifiable gas constitutes 2 to 6.7 weight % of the mixture.

4. The method of claim 1, wherein:

(a) coating an object comprises coating a continuous surface of an exposed material of the object to mask detection of the object by an electromagnetic detection apparatus; and (b) coating a zone spaced from the object comprises forming a coating which masks detection of the object by an electromagnetic detection apparatus.

* * * * *